May 10, 1960 — F. S. GOULDING — 2,936,382

TRANSISTOR SWITCHING CIRCUIT

Filed July 10, 1956 — 2 Sheets-Sheet 1

INVENTOR
FREDERICK S. GOULDING
By- Smart + Biggar
ATTORNEYS

INVENTOR
FREDERICK S. GOULDING
By- Smart + Biggar
ATTORNEYS 2,936,382
Patented May 10, 1960

2,936,382

TRANSISTOR SWITCHING CIRCUIT

Frederick Sydney Goulding, Deep River, Ontario, Canada, assignor to Atomic Energy of Canada Limited, Ottawa, Ontario, Canada Application July 10, 1956, Serial No. 596,890

4 Claims. (Cl. 307—88.5)

Figures 1, 2:
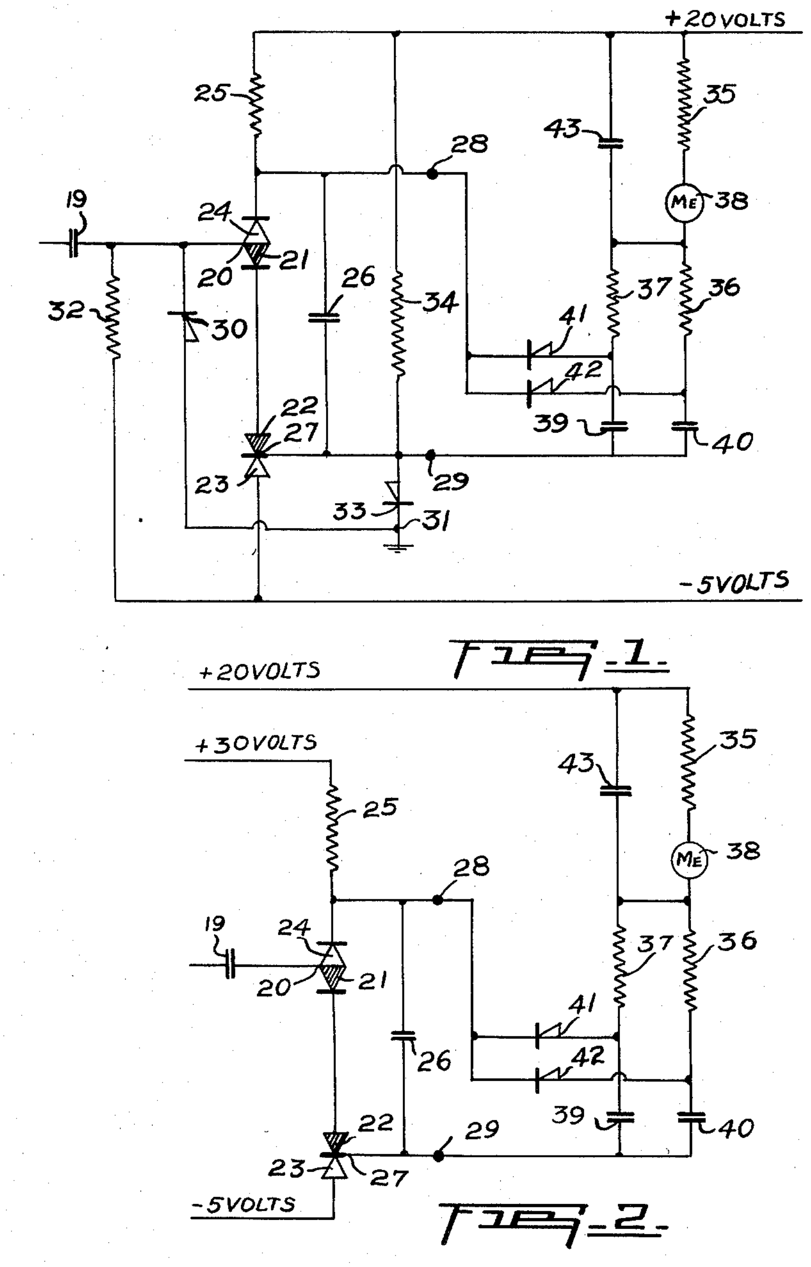

The present invention relates to apparatus, such for example as a circuit for measuring the rate of arrival of input voltage pulses, which, in response of an input voltage pulse, provides a low impedance connection between two output connections.

A one-shot multivibrator circuit has heretofore been employed in rate-meters. In this case the input voltage is applied to the control grid of the normally conducting vacuum tube of the multivibrator circuit. The input pulse causes the normally non-conducting tube to conduct for a predetermined period of time, an averaging circuit in the anode circuit of the normally non-conducting tube determines the mean current flowing through it. This provides a measure of the pulse rate. The disadvantage of this type of circuit is that when the circuit is in the stand-by condition, that is when no pulses are being received, one of the vacuum tubes will be conducting. In portable equipment this large current requirement for the stand-by condition is a severe handicap.

In an endeavour to reduce the power requirement of the circuit in the stand-by condition, transistors have been substituted for the vacuum tubes in the multivibrator circuit. However, in the stand-by condition one transistor must be conducting. The current drawn by this transistor consumes power which makes it difficult to design extremely portable equipment.

The present invention overcomes the faults of these known circuits by providing a circuit which in its stand-by condition draws practically no current.

The present invention provides apparatus responsive to an input voltage pulse to provide a low impedance connection between two output connections, said apparatus comprising a normally non-conducting n-p-n junction transistor, a normally non-conductnig p-n-p junction transistor, each transistor having a collector, an emitter and a base; a connection from the emitter of the n-p-n transistor to the emitter of the p-n-p transistor; a connection for supplying a first voltage to the collector of the n-p-n transistor, a connection for supplying a second voltage to the collector of the p-n-p transistor, the first voltage being positive with respect to the second voltage; a coupling circuit from the collector of one transistor to the base of the other transistor; said output connections being across the coupling circuit; a collector load impedance in series with the collector of said one transistor; an input connection for supplying said voltage pulse to either of the transistors, the voltage pulse causing the transistor to conduct thereby forming a low impedance connection between said output connections.

According to one embodiment of the invention, the input is connected to the base of the n-p-n transistor. In this case the collector of the p-n-p transistor is connected to the second voltage. The collector of the n-p-n transistor is connected through a collector load impedance to the first voltage. The coupling circuit is then connected from the collector and the n-p-n transistor to the base of the p-n-p transistor.

Alternatively the input may be connected to the base of the p-n-p transistor. In this case the collector of the p-n-p transistor is connected through a collector load impedance to the second voltage. The collector of the n-p-n transistor is connected to the first voltage. The coupling circuit is then connected from the collector of the p-n-p transistor to the base of the n-p-n transistor.

The base of the n-p-n transistor is preferably biased negatively with respect to the base of the p-n-p transistor. This may be done by connecting a first diode from ground to the base of the n-p-n transistor, and connecting a second impedance from the base of the n-p-n transistor to the second voltage. The first diode is adapted to conduct current from ground towards the base of the n-p-n transistor. A second diode is connected from ground to the base of the p-n-p transistor and a third impedance will then be connected from the base of the p-n-p transistor to the first voltage. The second diode is adapted to conduct current from the base of the p-n-p transistor to ground. The negative bias between the base of the n-p-n and the base of the p-n-p transistors is then due to the voltage drops in the two diodes. The coupling circuit preferably consists of a coupling capacitor.

According to a preferred embodiment of the invention, when the input is connected to the n-p-n transistor, at least one capacitor is connected across the output connections. A fourth impedance is then connected from the capacitor to the first voltage. A diode is then connected from the collector of the n-p-n transistor to a common point between the fourth impedance and the capacitor. The diode is adapted to conduct current from the capacitor to the collector of the n-p-n transistor. A means is provided which is adapted to measure current flowing through the fourth impedance.

According to one embodiment of the invention, when the input is connected to the base of the p-n-p transistor, at least one capacitor is connected across the output connection. A fourth impedance is connected from the capacitor to the second voltage. A diode is then connected from the collector of the p-n-p transistor to a common point between the fourth impedance and the capacitor. A means is provided which is adapted to measure current flowing through the fourth impedance. The diode is then adapted to permit current to flow from the collector of the p-n-p transistor to the capacitor.

The fourth impedance may alternatively be connected from the capacitor to a third voltage. In this case the first voltage is positive with respect to the third voltage, and the third voltage is positive with respect to the second voltage.

Figure 3:
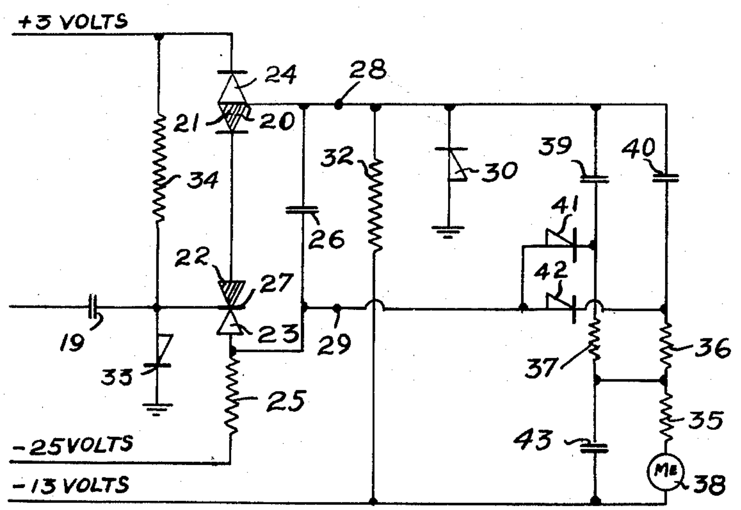
Figure 4:
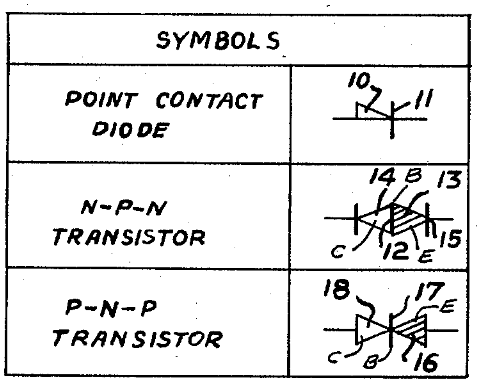

The invention will now be discussed with reference to the attached drawings in which, Figure 1 is a schematic circuit diagram of one embodiment of the invention, Figure 2 is a schematic circuit diagram of an alternative preferred embodiment of the invention, Figure 3 is a schematic circuit diagram illustrating a preferred embodiment of the invention, and Figure 4 is a table of the symbols used in Figures 1, 2 and 3, to illustrate point contact diodes, n-p-n transistors and p-n-p transistors.

The symbols used in Figures 1, 2 and 3 for point contact diodes, n-p-n transistors and p-n-p transistors are illustrated in Figure 4. The point of the triangle 10 of the point contact diode which touches the line 11 is always facing in the direction in which conventional current can flow, in other words the forward direction of the diode. The n-p-n transistor consists of a base 12, an emitter 13 and a collector 14. The point 15 of the emitter 13 is always facing in the direction in which conventional current may flow. The p-n-p transistor consists of an emitter 16, a base 17 and a collector 18. The point of the emitter 16 which touches the base 17 is always facing in the direction in which conventional current can flow.

An apparatus which, is responsive to an input voltage pulse, provides a low impedance between two output connections to which a rate meter circuit is connected as illustrated in Figure 1. The input pulse is connected through a capacitor 19 to the base 20 of the n-p-n transistor. The two emitters 21 and 22 are connected together. The collector 23 of the p-n-p transistor is connected to the −5 volt line. The collector 24 of the n-p-n transistor is connected through a resistor 25 to the +20 volt line. A coupling circuit, consisting of a capacitor 26, is connected from the collector 24 of the n-p-n transistor to the base 27 of the p-n-p transistor. The output connections are the points 28 and 29. A rate meter circuit is connected to the points 28 and 29. A diode 30 is connected between the base 20 of the n-p-n transistor and the ground point 31. A resistor 32 is connected from the base 20 of the n-p-n transistor to the −5 volt line. A biasing current flows from the ground point 31 through the diode 30 to the base 20 and through the resistor 32 to the −5 volt line. The resistor 32 is large enough to limit this current to approximately 100 microamperes. Thus the base 20 is biased slightly negative. A diode 33 is connected from the ground point 31 to the base 27 of the p-n-p transistor. A resistor 34 is connected from the +20 volt line to the base of the p-n-p transistor. A biasing current flows from the +20 volt line through the resistor 34 and the diode 33 to the ground point 31. In this way the base 27 is biased slightly positive. The resistor 34 is high enough to limit the biasing current to a very low value (approximately 100 microamperes).

In the stand-by condition, that is when no pulses are arriving at the base 20 of the n-p-n transistor, no current can flow from the base 20 to the emitter 21 of the n-p-n transistor and from the emitter 22 to the base 27 of the p-n-p transistor because the base 20 is biased negatively with respect to the base 27. A current flows from the +20 volt line through the resistors 35, 36, 37, and the current meter 38, to charge the capacitors 39 and 40. When the potential across the capacitors 39 and 40 reaches +20 volts this current will cease to flow. The circuit is now in the stand-by condition, and the only currents which are flowing are the very small biasing currents which flow through the resistors 32 and 34.

When a positive pulse of voltage is applied through the capacitor 19 to the base 20 of the n-p-n transistor the base 20 becomes positive with respect to the base 27. Consequently a current flows through the effective diodes of the two transistors, that is, a current flows from the base 20, through the emitter 21 and through the emitter 22 to the base 27. This current flowing from the base 20 to the emitter 21 of the n-p-n transistor causes an amplified current to flow from the +20 volt line through the resistor 25 and through the collector 24, to the base 20; in other words, the n-p-n transistor starts to conduct. For a similar season the p-n-p transistor starts to conduct. Due to the voltage drop across the collector load resistor 25 the potential of the collector 24 drops. This drop in potential is coupled, through the capacitor 26, to the base 27 of the p-n-p transistor. Since the potential of the base 27 has now been driven negatively, a larger current flows from the base 20 through the two emitters 21 and 22 to the base 27. This increased current flowing through emitter 21 causes an increase in the current flowing through the collector 24 of the n-p-n transistor. This increase is current in the collector 24 causes the potential of the collector 24 to drop still more. This regenerative condition continues until the potential of the collector 24 drops to the point where the base 20 loses control of the current flowing through the n-p-n transistor. In other words, the collector 24 bottoms. When the two transistors are conducting they represent approximately 100 ohms resistance between the points 28 and 29. Consequently the diodes 41 and 42 and the two transistors form a low impedance discharge path for the capacitors 39 and 40. The collector 24, of the n-p-n transistor, will remain bottomed as long as the capacitors 39 and 40 can supply current; in other words, until the capacitors 39 and 40 are practically discharged. The original input voltage which is very short in time duration, being of the nature of 3 microseconds, will have passed long before the capacitors 39 and 40 are discharged. When the capacitors 39 and 40 are discharged, the transistors cease to conduct. The capacitors 39 and 40 then charge towards 20 volts, the charging current flowing through the resistors 35, 36, 37 and the meter 38. The capacitor 43 acts as a low impedance filter which tends to average the current flowing through the current meter 38, when the mean interval between pulses is short compared with the charging time constant of the capacitor. The average current flowing through the meter 38 will be dependent on the rate of arrival of the pulses at the base 20 of the n-p-n transistor. In other words, the reading of the current meter 38 will be dependent on the rate of arrival of the pulses at the base 20 of the n-p-n transistor.

A leakage current flows through the resistor 25 and the collector 24 to the base 20 of the n-p-n transistor. This leakage current tends to cause the n-p-n transistor to conduct, however this tendency is completely swamped by the negative bias produced by the diode 30 and the resistor 32 (not shown in Figure 2). At high operating temperature this leakage current may become large enough to produce a substantial voltage drop across the resistor 25. If this should happen, then current would pass from the capacitors 39 and 40 to the collector 24 of the n-p-n transistor. Figure 2 illustrates a method of avoiding this adverse condition. In Figure 2 the collector 24 of the n-p-n transistor is connected through the resistor 25 to a +30 volt line. The capacitors 39 and 40 are charged through the resistors 35, 36, 37 and the meter 38 to a +20 volt line. The voltage drop across the resistor 25 can then be as high as 10 volts before the diodes 41 and 42 will pass current. The resistor 25 is of the nature of 100,000 ohms, thus a leakage current of as high as 100 microamperes can be tolerated. The leakage current at normal temperatures will be of the nature of 10 microamperes. The operation of the rest of Figure 2 is identical to the circuit of Figure 1 discussed above.

The input may be applied to the base 27 of the p-n-p transistor. A circuit employing this type of input is illustrated in Figure 3. In this case the collector of the n-p-n transistor is connected to a +3 volt line. The collector 23 of the p-n-p transistor is connected through the collector load resistor 25 to the −25 volt line. The resistor 32 is, in this case, connected to a −13 volt line. The capacitors 39 and 40 are charged through the resistors 35, 36, 37 and the current meter 38 towards the −13 volt line. The base 20 of the n-p-n transistor is, in the stand-by condition, biased negatively with respect to the base 27 of the p-n-p transistor. In this circuit the coupling circuit, consisting of the capacitor 26, is connected from the collector 23 of the p-n-p transistor to the base 20 of the n-p-n transistor. When a negative input voltage pulse is applied to the base 27 of the p-n-p transistor, by way of the input capacitor 19, the base 27 is driven negatively with respect to the base 20. Consequently, current flows through the effective diodes of the two transistors causing the transistors to conduct, and thus discharging the capacitors 39 and 40 in a similar way to that described above with reference to circuit of Figure 1.

By way of example, the following list shows typical values of the various components used in the circuit, as shown in Figure 3.

| | |
|---|---|
| Resistor **21** | 33,000 ohms. |
| Resistor **32** | 100,000 ohms. |
| Resistor **25** | 100,000 ohms. |
| Resistor **37** | 330,000 ohms. |
| Resistor **38** | 330,000 ohms. |

| | |
|---|---|
| Resistor 35 | 33,000 ohms. |
| Capacitor 39 | 0.022 microfarad. |
| Capacitor 40 | 0.22 microfarad. |
| Capacitor 43 | 60 microfarads. |
| Capacitor 26 | 470 micromicrofarads. |
| Diode 41 | Texas 601C. |
| Diode 42 | Texas 601C. |
| Diode 30 | IN-96. |
| Diode 33 | IN-96. |
| n-p-n transistor | Texas 201. |
| p-n-p transistor | 2N34. |

In the circuit, as shown in Figure 3, the charging time constant for the capacitor 39 is shorter than the charging time constant for the capacitor 40. The ratio of these time constants is chosen so that the average charging current flowing through the current meter 38 is logarithmically dependent on the rate of arrival of the pulses at the base 27 of the p-n-p transistor over a wide range. The ratio of the time constant could be course be varied to provide any desired dependency of the meter current on the rate arrival of the pulses. A circuit is illustrated in Figure 1 in which the input is applied to the base of the n-p-n transistor. Figure 3 illustrates a circuit wherein the input voltage also is applied to the base of the p-n-p transistor. The input may be applied to the collectors or emitters of either transistor. The polarity of the input pulse must be such that the input pulse causes the transistors to conduct.

What I claim as my invention is:

1. Apparatus responsive to an input voltage pulse to provide a low impedance connection between two output connections, said apparatus comprising; a normally non-conducting n-p-n junction transistor, a normally non-conducting p-n-p junction transistor, each transistor having collector, an emitter and a base; a connection from the emitter of the n-p-n transistor to the emitter of the p-n-p transistor; a connection for supplying a first voltage to the collector of the n-p-n transistor, a connection for supplying a second voltage to the collector of the p-n-p transistor, the first voltage being positive with respect to the second voltage and both voltages being connected to a common point of grounded reference potential; a capacitor connected from the collector of one transistor to the base of the other transistor; said output connections being across said capacitor; a collector load impedance in series with the collector of said one transistor; an input connection for supplying said voltage pulse to said one transistor, the voltage pulse causing the transistor to conduct only during application of the pulse thereby forming a low impedance path between said output connections, means to apply a fixed bias to the base of the n-p-n transistor, said bias being negative with respect to the base of the p-n-p transistor to maintain the transistors normally non-conductive in the absence of the input voltage pulse, a first diode connected from ground to the base of the n-p-n transistor, the first diode being adapted to conduct conventional current from ground to the base of the n-p-n transistor; said bias applying means including a second impedance connected from the base of the n-p-n transistor to the second voltage; a second diode connected from ground to the base of the p-n-p transistor, the second diode being adapted to conduct conventional current from the base of the p-n-p transistor to ground; and a third impedance connected from the base of the p-n-p transistor to the first voltage.

2. Apparatus responsive to an input voltage pulse to provide a low impedance connection between two output connections, said apparatus comprising; a normally non-conducting n-p-n junction transistor, a normally non-conducting p-n-p junction transistor, each transistor having a collector, an emitter and a base; a connection from the emitter of the n-p-n transistor to the emitter of the p-n-p transistor; a connection for supplying a first voltage through a load impedance to the collector of the n-p-n transistor, a connection for supplying a second voltage to the collector of the p-n-p transistor, the first voltage being positive with respect to the second voltage and both voltages being connected to a common point of grounded reference potential; a capacitor connected from the collector of the n-p-n transistor to the base of the p-n-p transistor; said output connections being across the capacitor; an input connection to the base of the n-p-n transistor for supplying said voltage pulse to the n-p-n transistor, the voltage pulse causing the transistors to conduct thereby forming a low impedance path between said output connections, means to apply a fixed bias to the base of the n-p-n transistor, said bias being negative with respect to the base of the p-n-p transistor to maintain the transistors normally non-conductive in the absence of the input voltage pulse, a first diode connected from ground to the base of the n-p-n transistor, the first diode being adapted to conduct conventional current from ground to the base of the n-p-n transistor; said bias applying means including a second impedance connected from the base of the n-p-n transistor to the second voltage; a second diode connected from ground to the base of the p-n-p transistor, the second diode being adapted to conduct conventional current from the base of the p-n-p transistor to ground; and a third impedance connected from the base of the p-n-p transistor to the first voltage.

3. Apparatus responsive to an input voltage pulse to provide a low impedance connection between two output connections, said apparatus comprising; a normally non-conducting n-p-n junction transistor, a normally non-conducting p-n-p junction transistor, each transistor having a collector, an emitter and a base; a connection from the emitter of the n-p-n transistor to the emitter of the p-n-p transistor; a connection for supplying a first voltage to the collector of the n-p-n transistor, a connection for supplying a second voltage through a collector load impedance to the collector of the p-n-p transistor, the first voltage being positive with respect to the second voltage; a capacitor connected from the base of the n-p-n transistor to the collector of the p-n-p transistor; said output connections being across said capacitor, an input connection to the base of the p-n-p transistor for supplying said voltage pulse to the p-n-p transistor, the voltage pulse causing the transistors to conduct only during application of the pulse thereby forming a low impedance path between said output connections, means to apply a fixed bias to the base of the n-p-n transistor, said bias being negative with respect to the base of the p-n-p transistor to maintain the transistors normally non-conductive in the absence of the input voltage pulse, a first diode connected from ground to the base of the n-p-n transistor, the first diode being adapted to conduct conventional current from ground to the base of the n-p-n transistor; a second impedance connected from the base of the n-p-n transistor to a third voltage; a second diode connected from ground to the base of the p-n-p transistor, the second diode being adapted to conduct conventional current from the base of the p-n-p transistor to ground; a third impedance connected from the base of the p-n-p transistor to the first voltage; at least one second capacitor being connected across said output connections; a fourth impedance being connected from the second capacitor to the third voltage; the first voltage being positive with respect to ground, the second voltage being negative with respect to the third voltage, the third voltage being negative with respect to ground; a third diode being connected from the collector of the p-n-p transistor to a common point between the fourth impedance and the second capacitor, the third diode being adapted to conduct conventional current from the collector of the p-n-p transistor to the second capacitor; and means adapted to measure current flowing through the fourth impedance.

4. Apparatus responsive to an input voltage pulse to provide a low impedance connection between two output connections, said apparatus comprising; a normally non-conducting n-p-n junction transistor, a normally non-conducting p-n-p junction transistor, each transistor having a collector, an emitter and a base, a connection from the emitter of the n-p-n transistor to the emitter of the p-n-p transistor, a connection for supplying a first voltage to the collector of the n-p-n transistor, a connection for supplying a second voltage through a collector load impedance to the collector of the p-n-p transistor, the first voltage being positive with respect to the second voltage; a capacitor connected from the base of the n-p-n transistor to the collector of the p-n-p transistor; said output connections being across said capacitor, an input connection to the base of the p-n-p transistor for supplying said voltage pulse to the p-n-p transistor, the voltage pulse causing the transistors to conduct thereby forming a low impedance connection between said output connections, means adapted to bias the base of the n-p-n transistor negative with respect to the base of the p-n-p transistor; a first diode connected from ground to the base of the n-p-n transistor, the first diode being adapted to conduct conventional current from ground to the base of the n-p-n transistor, said bias applying means including a second impedance connected from the base of the n-p-n transistor to a third voltage; a second diode connected from ground to the base of the p-n-p transistor, the second diode being adapted to conduct conventional current from the base of the p-n-p transistor to ground; a third impedance connected from the base of the p-n-p transistor to the first voltage; a further capacitor and a fourth impedance connected in series between the base of the n-p-n transistor and the third voltage, the first voltage being positive with respect to ground, the second voltage being negative with respect to the third voltage, the third voltage being negative with respect to ground; a third diode connected from the collector of the p-n-p transistor to a common point between the fourth impedance and the second capacitor, the third diode being adapted to conduct conventional current from the collector of the p-n-p transistor to the second capacitor; and means adapted to measure current flowing through the fourth impedance.

References Cited in the file of this patent

UNITED STATES PATENTS

| | | |
|---|---|---|
| 2,307,316 | Wolff | Jan. 5, 1943 |
| 2,520,621 | Beers | Aug. 29, 1950 |
| 2,666,818 | Shockley | Jan. 19, 1954 |
| 2,698,383 | Moody | Dec. 28, 1954 |
| 2,731,571 | Chance | Jan. 17, 1956 |
| 2,755,441 | Gulnac | July 17, 1956 |
| 2,764,687 | Buchanan | Sept. 25, 1956 |
| 2,769,907 | Lohman | Nov. 6, 1956 |
| 2,770,732 | Chong | Nov. 13, 1956 |
| 2,820,155 | Linvill | Jan. 14, 1958 |